Smith & Brumfield.
Revolving Rake.
Nº 60270. Patented Dec. 4, 1866.
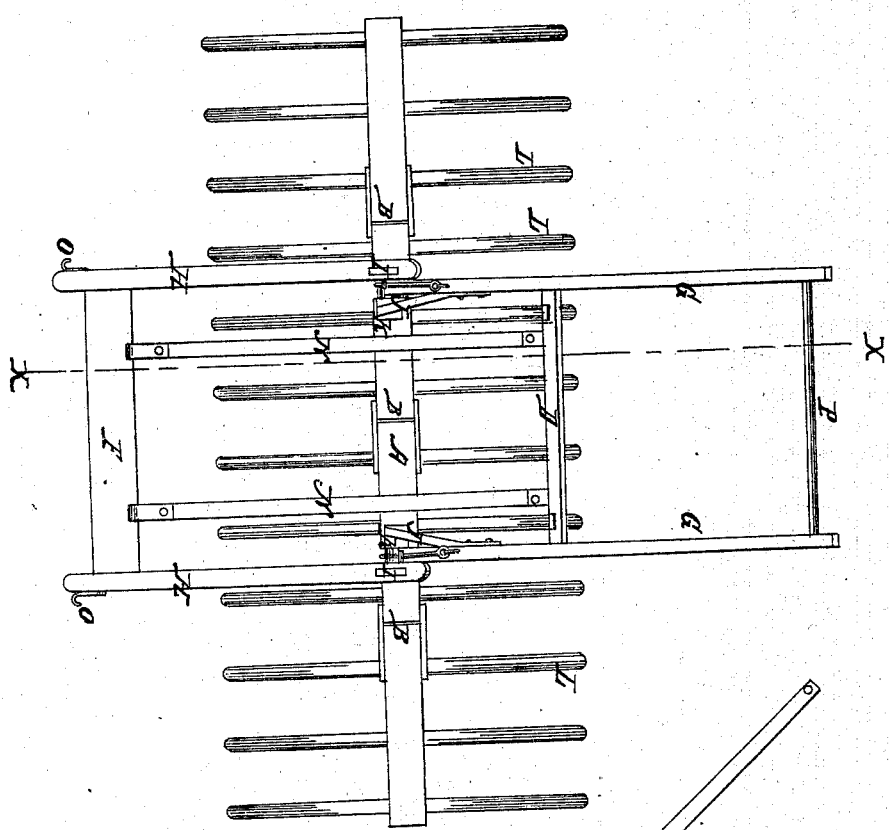
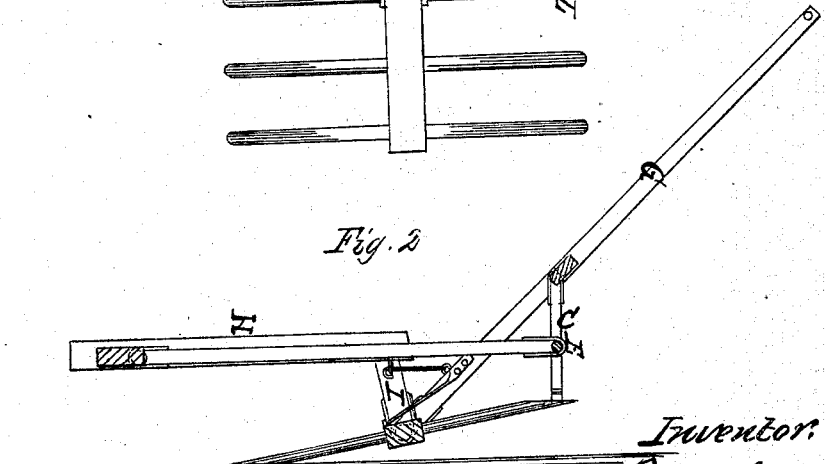

UNITED STATES PATENT OFFICE.

FRANCIS M. SMITH AND EDWIN BRUMFIELD, OF ALBION, NEW YORK.

IMPROVEMENT IN HORSE-RAKES.

Specification forming part of Letters Patent No. 60,270, dated December 4, 1866.

*To all whom it may concern:*

Be it known that we, FRANCIS M. SMITH and EDWIN BRUMFIELD, of Albion, Orleans county, State of New York, have invented a new and Improved Horse-Rake; and we do hereby declare that the following is a full, clear, and exact description thereof, which will enable others skilled in the art to make and use the same, reference being had to the accompanying drawing, forming part of this specification.

Our invention relates to a tumbling horse hay-rake the head of which is made in several sections; and the improvement consists in a novel arrangement of latches, straps, pendants, and spring-braces, as hereinafter described.

Figure 1 is a top-plan view of our improved horse-rake. Fig. 2 is a transverse sectional elevation from the line $x$ $x$.

To enable others skilled in the art to make and use our invention, we will proceed to describe its construction and operation.

Letters of like name and kind refer to like parts in each of the figures.

A represents the head of the rake, which we usually make of wood, and is made of sections. These sections are attached to each other by means of suitable joints, as seen at B B B. It will be seen that these joints are so constructed that each section has only a vertical motion, and no possibility of any lateral motion, at the said joints.

C C are the latches or pedals, secured by joints to the cross-bar D. To the standards of the said latches is attached a rod, E, passing from one to the other, and secured by proper means thereto. From this rod E are two straps or bars, N N, extending forward, and connected by joints to the cross-bar F. G G are the handles by which the rake is operated. The said handles are secured to the head by means of a strap passing around a journal or bearing, so that the head is allowed to revolve freely. H H are two bars, extending forward and connected by the cross-bar F. At the rear end of these bars are pendants I I, or posts, extending down, and also connected to the head by means of strap-joints. At the front end of these bars or shafts G G are secured draft-hooks $o$ $o$, to which the horse is attached, and by which the rake is drawn.

It will here be observed that at or near the lower end of the handles G G are secured spring-braces J J, the lower ends of which have a bearing in the lip or flanged plates K K.

L L L are the teeth which pass through the head, having equal projections upon either side, in the ordinary or common way.

The operation simply consists in attaching the horse to the hooks $o$ $o$. At the same time the operator grasps the handles at the cross-rod P, and proceeds across the field, the front end of the teeth running close to the ground. When a sufficient quantity of hay has accumulated upon the teeth in front of the rake, the operator raises the ends of the handles upon which he has a hold. At the same time the braces J J form a bearing against the flange-plate K K, which throws the front end of the teeth to the ground; also, at the same time, the pedals or feet of the pendants I I are thrown from the back end of the teeth, and, thus relieved, the head is thrown over or revolved, and the driver proceeds as before.

From the adjustable and accommodating nature of the head to the ground, this rake possesses great advantages over the common or ordinary rake now in use.

Having thus described our invention, what we claim as new, and desire to secure by Letters Patent of the United States, is—

The combination of the jointed latches C, straps N N, pendants I, spring-braces J, flanged plate K, jointed head B, and teeth L, arranged and operating substantially as described, for the purpose specified.

FRANCIS M. SMITH.
      EDWIN BRUMFIELD.

Witnesses:
 WILLIAM McGOWAN,
 J. O. BROWN.